Jan. 25, 1938. D. E. WILSON 2,106,333
AUTOMOBILE SIGNAL DEVICE
Filed Aug. 11, 1936

Inventor
David E. Wilson
By Frank Hanrahan
Attorney

Patented Jan. 25, 1938

2,106,333

UNITED STATES PATENT OFFICE 2,106,333

AUTOMOBILE SIGNAL DEVICE

David E. Wilson, Santa Monica, Calif.

Application August 11, 1936, Serial No. 95,376

4 Claims. (Cl. 177—329)

This invention relates generally to signal devices that are adapted to be attached to automobiles. Devices of this kind are usually operated by the driver of the automobile and are used to convey the intent of the driver to those immediately behind or somewhere near the automobile. Most of these devices merely indicate that the driver intends to stop or turn and while these devices may be efficient for such purposes, they ordinarily do not attract the attention other than as a purely mechanical device. In view of this, it is a primary object of my invention to provide an automobile signal device of such a nature that the attention of other drivers, particularly in the car following, is attracted to the signal by features designed to carry more than a mere mechanical signal, which is controlled by the driver of the automobile and which will indicate to persons driving behind the automobile that the driver is aware of their presence. Thus, if as often happens, the car with the signal is stopped at a crossing signal and a driver of a car behind should repeatedly blow his horn, the driver of the automobile upon which the invention is attached may signal, by means of the invention, the fact that he has heard the horn of the car behind and convey by means of the signal his resentment or displeasure at the annoying and unnecessary tooting of the horn.

It is another object of this invention to provide a signal device of simple form and construction for automobiles, which may be attached to the rear end of an automobile and be operated from the driver's compartment, providing a visible and audible effect. In other words, it is an object of this invention to provide a signal device which has a moving visible part, a light, and sound producing apparatus.

It is also an object to provide a signal device which may be operated from the intake manifold of an automobile, or which may be operated by the exhaust gases of an automobile, in conjunction with an electrical circuit.

Although the device is primarily intended for use on automobiles, it is not contemplated to so restrict its use, as it is also an object of this invention to provide a device which may be used as an advertising display or toy. Other uses and objects will be apparent from the description and drawing, in which—

Figure 1:
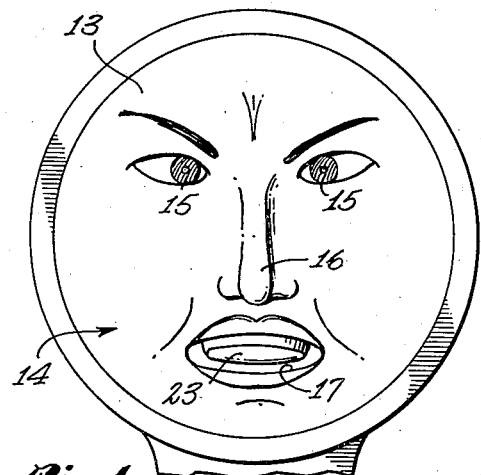
Fig. 1 is a front elevation of the invention.

Referring to the drawing, 11 indicates a housing of metal or other suitable material having a bracket member 12 depending therefrom. The housing has a front cover 13 which carries upon it a face generally indicated by 14. The face has glass eyes 15, a protruding nose 16 and a mouth opening 17. The cover 13 has a flange 13' adapted to fit inside of the housing 11.

Figure 2:
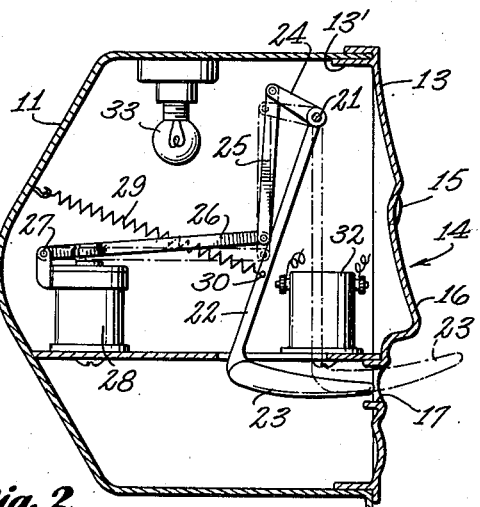
Fig. 2 is a side elevation of the preferred form of the invention showing the housing in cross section and the parts in full line.
Figure 3:
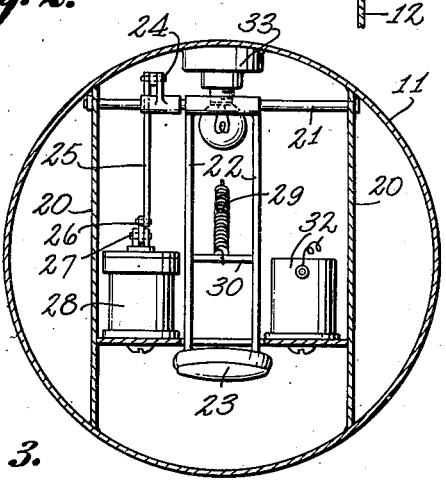
Fig. 3 is a front elevation with the face removed.

Mounted in the housing are supporting members 20 into which is journaled a horizontal rod 21 to which is attached near its center two depending tongue supports 22 connected by a brace 30, which support a tongue member 23. Near one end of rod 21 is rigidly attached a short arm 24 to which at its outer end is pivotally connected a link 25 which in turn is pivotally connected to an actuating arm 26. This arm 26 is pivotally mounted at 27 on a solenoid 28, and is adapted to move downwardly when the solenoid is energized. A spring 29 attached to the housing 11 at one end and to the brace 30 at the other end is adapted to hold the arm and the tongue 23 in the retracted position shown in Fig. 2 when there is no current passing through the solenoid 28. When the solenoid 28 is energized, the parts assume the position shown by the broken lines in Fig. 2. In the operation of the device the solenoid attracts the arm 26 which in turn pulls the link 25 which pulls the arm 24 downwardly. This rotates the rod 21 thus transmitting movement to the tongue supporting members 22 which move the tongue 23 into the position shown by the broken lines in Fig. 2.

A buzzer, or other sound producing device, is mounted in the housing at 32. An electric light, or lamp, 33 is mounted in the housing and is adapted to illuminate the eyes 15.

Figure 4:
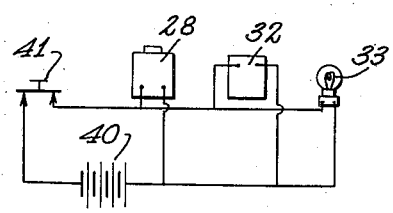
Fig. 4 is a wiring diagram of the preferred form of the invention illustrated in the first four figures.

In Fig. 4 is shown a method of connecting the solenoid, the buzzer and the electric light in the preferred form of the invention. In this diagram, batteries 40 have been shown, but the invention contemplates any source of electrical current such as the electrical circuit of the automobile. The units 28, 32 and 33 are shown connected in parallel in an open circuit. The circuit is closed by means of a push button 41. It is primarily intended that the push button 41 be located in the driver's compartment of the automobile in order that the signal device can be conveniently operated. However, any convenient location for the push button is within the scope of the invention since the invention need not necessarily be limited to use on automobiles.

From the above it will be seen that in the preferred form of the invention which is illustrated in Figs. 1 to 4, the depression of the push button 41 closes the electrical circuit simultaneously actuating the solenoid 28, thus causing the tongue 23 to protrude through the mouth opening 17, the buzzer 32 causing it to produce sound, and the light 33 causing it to illuminate the eyes 15.

Figure 5:
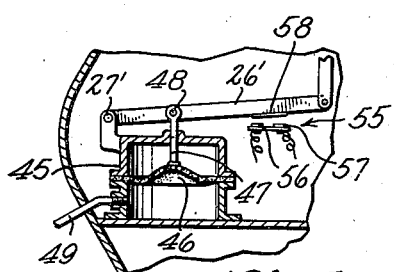
Fig. 5 is a fragmentary section of a modified form of actuating mechanism.

In Fig. 5 is shown a modified means for actuating the device. In this form of the invention a cylinder 45 having a diaphragm 46 and a connecting rod 47 is adapted to actuate the arm here shown as 26' and which is pivotally mounted on cylinder 45 at 27'. For this purpose the connecting rod 47 is pivotally connected to the arm 26' at 48. The cylinder in this form of my invention is shown as a vacuum cylinder and has a conduit 49 which leads to the intake manifold of the automobile. At a convenient point in this conduit is located a valve, not shown, which may be operated by the operator of the car for the purpose of creating a vacuum in the lower portion of the cylinder 45. This acts to depress the diaphragm 46 and the connecting rod 47, thereby pulling the arm 26' downwardly.

Figure 6:
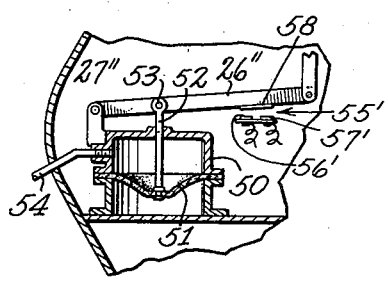
Fig. 6 is a fragmentary section of a modified form of actuating mechanism.

In Fig. 6 is shown another means of actuating the tongue member and in this form of the device a cylinder 50, having a diaphragm 51 and a connecting rod 52 which is pivotally connected to the arm 26" at 53. The arm 26" is pivotally mounted on cylinder 50 at 27". In this form of the device the pressure caused by the escaping gas in the exhaust pipe of an automobile is utilized by conducting some of the gas through conduit means 54 to the cylinder. A valve is suitably located in the conduit in order to control the device. Opening of the valve to the pressure of the exhaust gases causes the diaphragm 51 to move downwardly, thus pulling the arm 26" down by means of the connecting rod 52.

In each of these modified forms shown in Figs. 5 and 6, the electric light and the buzzer are electrically connected to a source of current through a switch, indicated at 55 (and 55') which comprises two contact points 56 and 57 (and 56' and 57') which are closed by means of the actuating link 26', in the one case, (and by 26" in the other case) which has a conducting member 58 (and 58') adapted to contact the two points.

In the two modified forms of the device it will be seen that in either case the signal is operated by means of the driver of the automobile who operates a valve which either causes a vacuum in the space below the diaphragm 46 of cylinder 45 of the form shown in Fig. 5 or causes pressure in the cylinder 50 above the diaphragm 51 as the case may be. In both cases, the arm 26' (or 26") is depressed, thereby moving the tongue member 23 outwardly and through the mouth 17 by means of the connecting links previously described. When the link 26' (and 26") has been depressed to its lowermost limits conducting member 58 (and 58') engages the contact points 56 and 57 (and 57', 58'), thus closing the circuit which includes the buzzer and the light.

In all forms of the device, then, it will be seen that the tongue is made to protrude, the eyes 15 to light and a noise to issue from the device by one operation of the driver of the automobile.

As previously pointed out the device is adaptable for use as a window display or other advertising purposes, or it may be used as a toy.

I claim as my invention:

1. In an automobile signal device having a housing with a relatively large opening and two relatively small openings therein, the combination of a tongue movably mounted in said housing; electric light means in said housing adapted to illuminate said relatively small openings; and electrical means for actuating said tongue, sound producing member, and light means simultaneously, said electrical means including a remote control means.

2. In an automobile signal device having a housing with a relatively large opening and two relatively small openings therein, the combination of a tongue movably mounted in said housing adapted to be moved through said mouth; a solenoid, means cooperating with said solenoid for moving said tongue; an electric light; an electric sound producing device; and means for actuating said solenoid, light, and sound producing device simultaneously.

3. In an automobile signal device having a housing with a relatively large opening and two relatively small openings therein, the combination of: a tongue member movably mounted in said housing and adapted to extend through said relatively large opening; a solenoid mounted in said housing; means operated by said solenoid for moving said tongue member; sound producing means in said housing; an electric lamp in said housing behind said relatively small openings; and electric means for simultaneously actuating said solenoid, said lamp and said sound producing means, said electric means including a push button located in the automobile.

4. An automobile signal device comprising: a housing with a relatively large opening and two relatively small openings therein; a rod rotatably mounted in said housing; supporting members rigidly mounted on said rod; a tongue member mounted on said supporting members behind said relatively large opening; an arm rigidly mounted on said rod; an actuating lever pivotally mounted in said housing; a link pivotally connecting said actuating lever and said arm; a solenoid adapted to attract and thereby move said actuating lever whereby said tongue member is caused to protrude through said relatively large opening; spring means yieldably holding said tongue member behind said relatively large opening; an electric lamp in said housing adapted to illuminate said relatively small openings; sound producing means in said housing; and means for simultaneously operating said solenoid, lamp, and sound producing means.

DAVID E. WILSON.